United States Patent
Li

(10) Patent No.: US 11,211,787 B2
(45) Date of Patent: Dec. 28, 2021

(54) ELECTRICAL PROTECTION CIRCUIT BREAKER

(71) Applicant: Yaoya Li, Foshan (CN)

(72) Inventor: Xiangying Li, Foshan (CN)

(*) Notice: Subject to any disclaimer, the term of this patent is extended or adjusted under 35 U.S.C. 154(b) by 0 days.

(21) Appl. No.: 17/077,043

(22) Filed: Oct. 22, 2020

(65) Prior Publication Data

US 2021/0066910 A1   Mar. 4, 2021

Related U.S. Application Data

(63) Continuation of application No. PCT/CN2019/083607, filed on Apr. 22, 2019.

(30) Foreign Application Priority Data

Apr. 24, 2018 (CN) .......................... 201810374868.6
Feb. 21, 2019 (CN) .......................... 201910140340.7

(51) Int. Cl.
*H02H 7/22*   (2006.01)
*H02H 1/00*   (2006.01)

(52) U.S. Cl.
CPC .......... *H02H 7/226* (2013.01); *H02H 1/0007* (2013.01)

(58) Field of Classification Search
CPC ........ H01H 9/54; H01H 47/02; H02H 1/0007; H02H 7/226
See application file for complete search history.

(56) References Cited

U.S. PATENT DOCUMENTS

| 6,231,227 B1* | 5/2001 | Andersen ............. H01H 1/0015 374/4 |
| 10,176,940 B2 | 1/2019 | Pignier et al. |
| 2016/0276116 A1* | 9/2016 | Pignier ................ H02H 1/0007 |
| 2019/0036329 A1 | 1/2019 | Rezaei Jegarluei et al. |
| 2019/0109451 A1 | 4/2019 | Takemura et al. |

FOREIGN PATENT DOCUMENTS

| CN | 101202185 A | 6/2008 |
| CN | 101226209 A | 7/2008 |

OTHER PUBLICATIONS

Internation Search Report of PCT/CN2018/083607, dated Jul. 3, 2019.

* cited by examiner

*Primary Examiner* — Jared Fureman
*Assistant Examiner* — Christopher J Clark

(57) ABSTRACT

An electrical protection circuit breaker comprises a microprocessor chip part, a circuit breaker part connected between a power line and a power supply, a temperature detection part for detecting a temperature of the power line, a current detection part for detecting a current of the power line, and a voltage detection part for detecting a voltage of the power line. A memory of the microprocessor chip part stores a data collection S=f(temp, I, V, Δtime), wherein S represents a diameter of the power line, temp represents the temperature, I represents the current, V represents the voltage, and Δtime represents a set time period. The microprocessor chip part matches electronic data of real-time temperature changes, electronic data of an import current, and electronic data of a voltage with data sets in the data collection, and sets a corresponding safety protection current according to matching results.

10 Claims, 6 Drawing Sheets

ELECTRICAL PROTECTION CIRCUIT BREAKER

CROSS-REFERENCE TO RELATED APPLICATIONS

This application is a continuation of International Patent Application No. PCT/CN2019/083607 with a filing date of Apr. 22, 2019, designating the United States, and claims the priority to Chinese Patent Application No. 201810374868.6 with a filing date of Apr. 24, 2018, and further claims the priority to Chinese Patent Application No. 201910140340.7 with a filing date of Feb. 21, 2019. The content of the aforementioned applications, including any intervening amendments thereto, are incorporated herein by reference.

TECHNICAL FIELD

The disclosure relates to an electric protection technology.

BACKGROUND

Current electric protection circuit breakers and protection methods are based on a comparator with a preset reference value. For example, when a circuit breaker with a rated current of 63 A is used, the circuit breaker will always compare an actual current with the rated current of 63 A. When the actual current is more than the rated current of 63 A, the circuit breaker will disconnect a circuit to play a protective role. However, if a diameter of a wire installed by a constructor does not match the rated current of the circuit breaker for some reason, the circuit breaker will fail. For example, if the constructor installed a copper wire with a sectional area of 6 mm2, but chose the 63 A circuit breaker, then the circuit breaker could not play a protective role. The copper wire with a sectional area of 6 mm2 can only pass through a 48 A current safely. After deducting factors such as pipe passing, wall entering and ambient temperature, a safe current is only 80%. The actual current should not exceed 40 A; otherwise, there is a risk of fire. If a user selects the 63 A circuit breaker, the circuit breaker will not trip for protection until the wire is short-circuited due to fire. It is not uncommon for such mismatching of the diameter of the wire with the circuit breaker. Especially in some engineering of construction teams with dishonesty, jerry-built materials often appear: the circuit breaker is installed in a switch box, which can be seen by everyone, and is not easy to fake, but the wire is installed through a pipe into a wall, which cannot be seen by everyone, so it is easy for illegal construction teams to change the mire into wires with small diameter to get higher engineering profits.

SUMMARY

Technical Problems

An objective of the disclosure is to provide an electric protection circuit breaker which can detect a diameter of a wire and set a safety protection current according to the diameter of the wire.

Solutions to the Problems

Technical Solutions

The disclosure is realized as follows. An electric protection circuit breaker includes a microprocessor chip part, a circuit breaker part connected between a power line and a power supply, a temperature detection part for detecting a temperature of the power line, a current detection part for detecting a current of the power line, and a voltage detection part for detecting a voltage of the power line, wherein a data collection of data sets of temperature change values, input current values, and voltage values, corresponding to various national standard diameters (such as 4 $mm^2$ or 6 $mm^2$) of power lines, imported in a set time period when a national standard voltage is applied, is stored in a memory of the microprocessor chip part in the set time period, electronic data of an input current of the power line detected by the current detection part for detecting the current of the power line is transmitted to the microprocessor chip part, electronic data of a voltage of the power line detected by the voltage detection part for detecting the voltage of the power line is transmitted to the microprocessor chip part, and electronic data of a temperature of the power line detected by the temperature detection part is transmitted to the microprocessor chip part to determine data of a temperature change; the microprocessor chip part matches the electronic data of the temperature change, the electronic data of the input current, and the electronic data of the voltage obtained with the data sets in the data collection; if the matching is successful, the power line is confirmed to have the national standard diameter corresponding to the matched data set, and then the microprocessor chip part sets a corresponding safety protection current according to diameter information of the actually used power line obtained.

A diameter, as real-time temperature, and a real-time power of a wire all have a direct mathematical relationship. When a current reaches a certain value, a temperature of a power line rises. The rise of the temperature is related to a diameter of the power line. For example, when several kilo-watts of electrical appliances are connected, the temperature of the power line rises until a balance between heating and heat dissipation is reached. When a large current is connected at the beginning, the temperature rise is obviously, which is mainly related to the current, the diameter of the power line, a voltage and a duration. When the current, the voltage and the duration are determined, the diameter of the power line is determined, which provides a possibility to accurately know the diameter of the power line by analyzing a relationship between the current and the temperature. In advance, a large number of tests are carried out under different conditions, and a data collection formed by data sets obtained from the tests is pre-stored in the microprocessor chip part. By using big data machine learning and using a small amount of currents and temperature sensors, the diameter of the wire can be calculated through a relationship among the real-time temperature and the real-time current of the wire and a temperature change rate of the wire when the current changes, so as to automatically set a safety protection current. In this way, a function of intelligent setting of protection limits can be achieved. Even if a user does not know how to select an appropriate circuit breaker, or a wrong circuit breaker is installed due to jerry-built materials, the circuit breaker can also play a role of power safety protection.

Here, the circuit breaker part includes a power-off relay, the power-off relay, the microprocessor chip part and the power line form an over-current protection circuit arranged in a shell, the over-current protection circuit adopts an integrated circuit for high-precision measurement of electric consumption and leakage value with the power-off relay and the power line, and a power switch of the power-off relay is connected to the power line; one end of the power line is connected with an external power access terminal and the other end of the power line is connected with an output power access terminal; the shell is provided with a data and drive power interface, and a data exchange end and a drive power input end of the integrated circuit for high-precision measurement of electricity consumption and leakage value are connected with the data and drive power interface.

When in use, the power line is connected with an external power supply through the external power access terminal (for example, an external power access terminal of a live wire is connected with an external live wire, and an external power access terminal of a neutral wire is connected with an external neutral wire), while the output power access terminal is connected with a user power access terminal (for example, an output power access terminal of the live wire is connected with a live wire of the user power access terminal, and an output power access terminal of the neutral wire is connected with a neutral wire of the user power access terminal); the power line is connected with a device having a drive power supply for data receiving (transmission) and outputting (such as wifi device) through a data line (such as USB data line); in this way, current data and temperature data obtained by the integrated circuit for high-precision measurement of electricity consumption and leakage value can be sent out, so that a monitor can monitor a power consumption situation in real time; when the current is too large or the temperature is too high, an alarm can be sent to the monitor through a corresponding device, so that the monitor can process in time or send a control signal to control power-off of an electric protection circuit breaker; when the current exceeds a set safety value or the temperature is higher than a set value due to leakage, the integrated circuit for high-precision measurement of electricity consumption and leakage value controls the relay to operate to disconnect the power supply.

The existing current protectors are generally divided into three types: leakage protection, overload protection and undervoltage protection. These protectors are basically provided with fixed parameters, and are preset with a target value while delivery. For example, a product of model 01 trips automatically when the leakage is 5 mA, and a product of model 02 trips when the leakage is 30 mA; overload protection and undervoltage protection products are also designed in similar ways. Users can not adjust these protectors flexibly when a power consumption environment changes. In addition, a detection accuracy of a line current is often subject to an accuracy of a sampling resistor. Once installed as finished products, these protectors need to be disassembled in case of adjustment, which are very troublesome.

In current electric protection devices, there is no information communication mechanism between protection devices and appliance devices, so the users cannot clearly know a specific safety situation in the line, for example, only know that there is leakage in a room, but do not know which room and which branch are leaking, and do not know exactly how much electricity is leaking. The users do not know the details and cannot quickly correct the leakage in advance. The appliance devices need to be checked one by one. The leakage cannot be known before the leakage value exceeds a designed threshold to cause trip. Hidden dangers cannot be eliminated before the trip happens.

In the existing overload protector, meanwhile, in an actual power consumption process, because a power customer is not the same person as a line designer and a line installer, the power customer does not necessarily use power in the way designed by the designer. For example, the designer designed an overload protection of 30 A, but the power customer accessed line with a maximum load of 20 A when using the overload protector, which results in a consequence that an overload protection switch will not trip even if the line melts and catches fire. This will cause the protection mechanism to fail, which also proves that an overload monitoring mechanism, of the current overload protector is not perfect.

The prior arts react only when a danger occurs, and the occurrence of the danger is usually premonitory. Because the prior arts effectively detect a current condition before the danger occurs, it is impossible to take preventive measures based on the current condition to avoid the occurrence of the danger.

By adopting the above technology, the problems in the prior art are solved, so that the current and the temperature can be monitored in real time, and an alarm can be given in case of excessive current and temperature, so that the user can take preventive measures in time to avoid danger and cut off the power supply when the set current or temperature is exceeded.

Here, a wireless network communication part is provided, wherein the data acquired by the microprocessor chip part is transmitted to a background server through the wireless network communication part, and the background server also transmits data acquired by other electric protection circuit breakers to the electric protection circuit breaker, so as to use big data machine learning to improve an accuracy for the electric protection circuit breaker to intelligently judge the diameter of the power line.

Here, at least one of the external power access terminal and the output power access terminal is provided with a temperature detection device, and an electric signal output of the temperature detection device is connected with an electric signal input of the integrated circuit for high-precision measurement of electricity consumption and leakage value.

In the prior art, only the current is detected, and then the current is too large, the temperature of the wire often rises, so the prior art cannot sense the temperature change and take corresponding safety measures accordingly.

When in use, the temperature data detected by the integrated circuit for high-precision measurement of electricity consumption and leakage value can be sent out, so that the monitor can monitor the power consumption situation in real time. When the temperature is too high due to excessive current, an alarm can be sent to the monitor through a corresponding device, so that the monitor can handle in time or send a control signal to control the current protector to power off. When the temperature is higher than the set value due to leakage, the integrated circuit for high-precision measurement of electricity consumption and leakage value controls the relay to operate to disconnect the power supply.

Here, in order to improve monitoring accuracies of the disclosure on an electric current and a leakage current, before delivery, the disclosure uploads a presently monitored current value (such as a detection value of 101 mA) to a cloud server by passing an electric current of a high-precision standard value to the disclosure as a reference value, such as 100 mA, the cloud server records a deviation, and carries out calculation and correction processing, and feeds back a correction algorithm to the memory in the microprocessor. After the disclosure is put into use, the deviation value is added to each measurement. The method is also used in detection and calculation technologies of leakage current. Therefore, a measuring accuracy of the disclosure can be significantly improved.

Here, more than one data exchange interface is arranged on the microprocessor chip part of the integrated circuit for high-precision measurement of electricity consumption and leakage value, and more than one power output interface is arranged on the corresponding power circuit, thus forming a main electric protection circuit breaker. When in use, electric protection circuit breakers without wireless transceiver and power circuit are connected with the main electric protection circuit breaker with wireless transceiver and power circuit through data lines and power lines with access terminals, so that the electric protection circuit breakers without wireless transceiver and power circuit can obtain a drive power supply for work, and obtained power consumption data thereof can be sent out through the wireless transceiver of the main electric protection circuit breaker with wireless transceiver and power circuit.

Beneficial Effects

Compared with the prior art, the disclosure has the advantages of being capable of detecting the diameter of the wire, and setting the safety protection current according to the diameter of the wire, monitoring the current and the temperature in real time and giving an alarm when the current is too large and the temperature is too high, so that the user can take preventive measures in time to avoid danger and cut off the power supply when the set current or temperature is exceeded.

DETAILED DESCRIPTION

The disclosure will now be described in further detail with reference to the drawings and embodiments.

Figure 1:
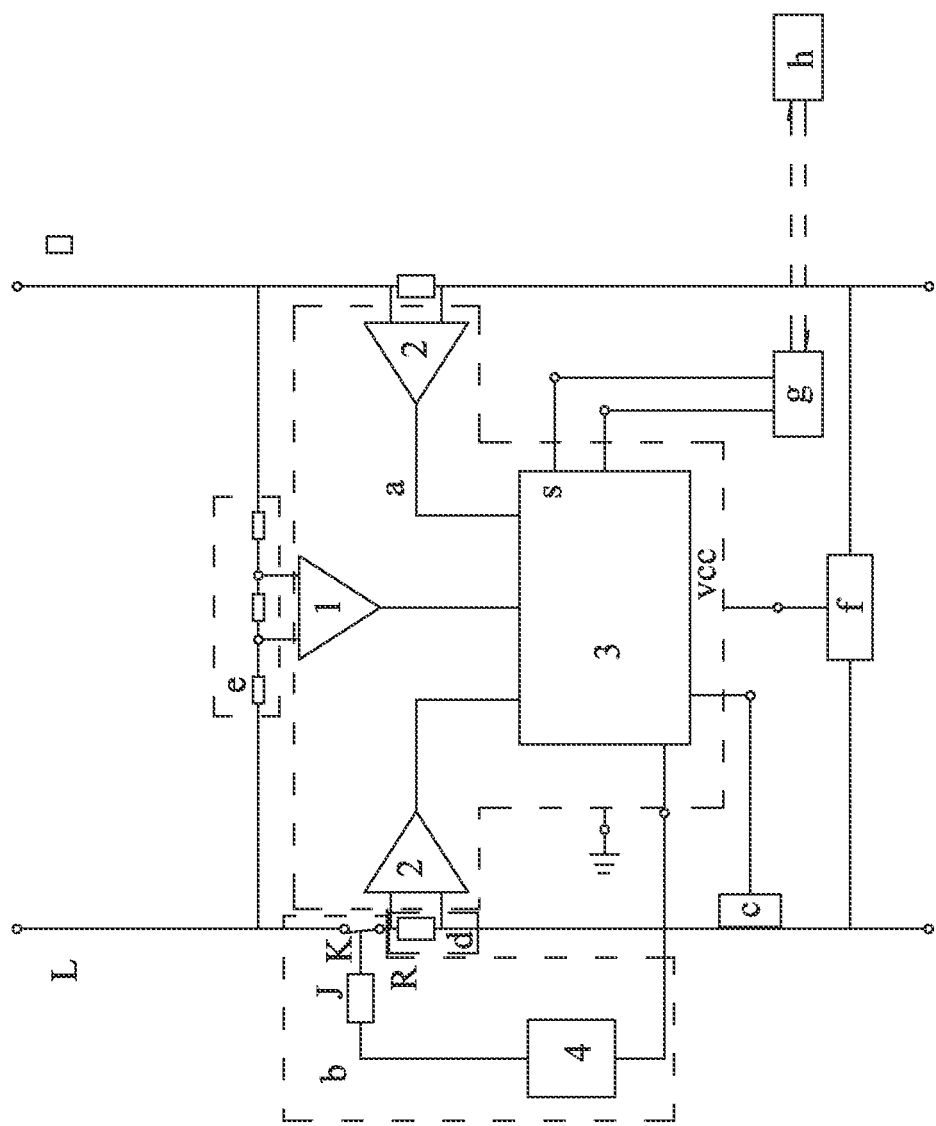
FIG. 1 is a structure diagram of Embodiment 1 of the disclose.

Embodiment 1: as shorn in FIG. 1, the disclosure includes a microprocessor chip part a (e.g., adopting the technology of CN201810152332.X), a circuit breaker part b connected between a power line L and a power supply, a temperature detection part c for detecting a temperature of the power line, a current detection part d for detecting a current of the power line, and a voltage detection part e for detecting a voltage of the power line. The microprocessor chip part a integrates a voltage detection electric signal amplifier 1, a current detection electric signal amplifier 2, a microprocessor 3 with a memory, and a power circuit f that drives the microprocessor chip part a to work. The circuit breaker part b includes a switch circuit 4 with a relay J, wherein one power line (such as the power line L connected with a live wire) is connected with loads (including high-power electrical sockets such as electric water heater and main switch) through a switch K of the relay J. A control signal output of the microprocessor 3 controls the relay J to operate through the switch circuit 4. Two signal input pins of the current detection electric signal amplifier 2 are connected to an electrode plate of the switch K of the relay J, and the electrode plate between the two signal input pins forms a low-resistance current sampling resistor R. A data collection $S=f(temp, I, V, \Delta time)$ of data sets of temperature change values, input current values, and voltage values, corresponding to various national standard diameters of power lines, imported in a set time period when a national standard voltage is applied, is stored in the memory 1 of the microprocessor chip part a. Wherein, S represents the diameter of the power line, temp represents the temperature change, I represents the current, V represents the voltage, and $\Delta time$ represents the set time period. In the set time period, if the temperature of the power line rises, electronic data of an input current of the power line detected by the current detection part d for detecting the current of the power line is transmitted to the in processor chip part a, electronic data of a voltage of the power line detected by the voltage detection part e for detecting the voltage of the power line is transmitted to the microprocessor chip part a, and electronic data of the temperature of the power line detected by the temperature detection part c is transmitted to the microprocessor chip part a to determine data of a temperature change. The microprocessor chip part a matches the electronic data of the temperature change, the electronic data of the import current, and the electronic data of the voltage obtained with the data sets in the data collection. If the matching is successful, the power line with the national standard diameter corresponding to the matched data set is an actually used power line, and then the microprocessor chip part a sets a corresponding safety protection current according to diameter information of the actually used power line obtained to replace a preset maximum safety protection current (for example, the maximum safety protection current is set according to the normally used maximum diameter of the power line before the product is delivered).

A wireless network communication part g is provided, wherein the data acquired by the microprocessor chip part a is transmitted to a background server h through the wireless network communication part g, and the background server h also transmits data acquired by other electric protection circuit breakers to the electric protection circuit breaker, so as to use big data machine learning to improve an accuracy for the electric protection circuit breaker to intelligently judge the diameter of the power line.

Figure 2:
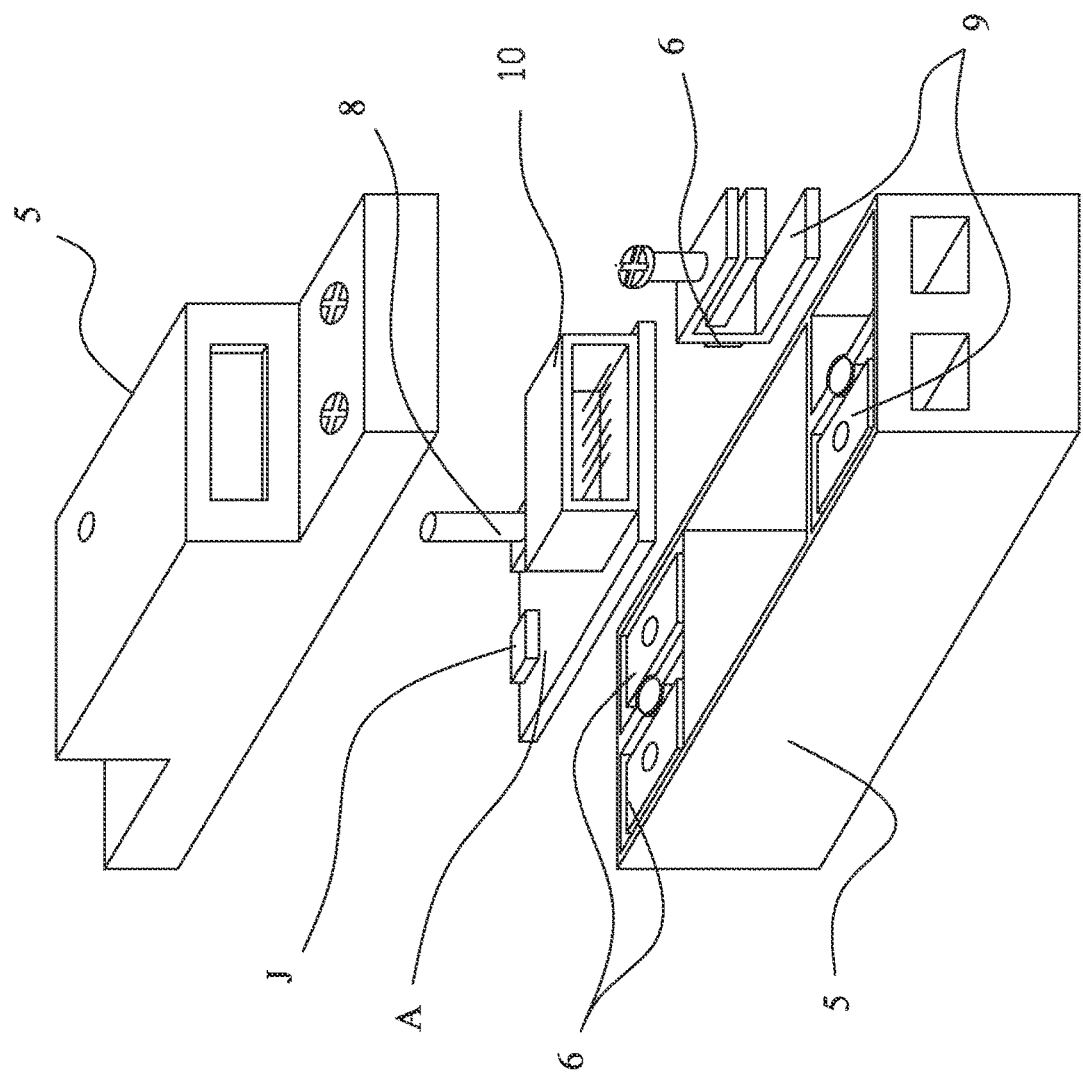
FIG. 2 is a structure diagram of Embodiment 2 of the disclosure.
Figure 6:
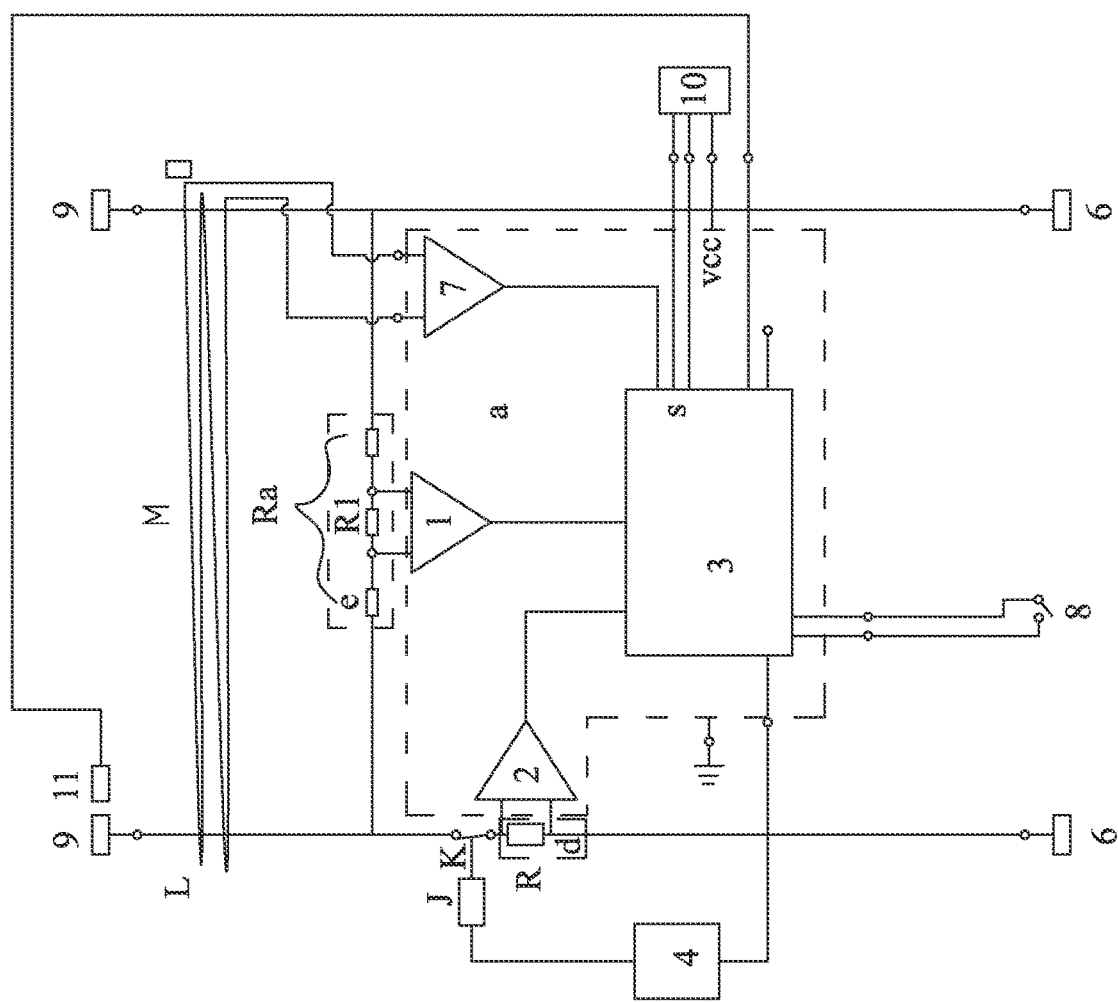
FIG. 6 is a schematic circuit diagram of Embodiment 2.

Embodiment 2: as shown in FIG. 2 and FIG. 6, the circuit breaker part b includes a power-off relay J. The power-off relay J, the microprocessor chip part a and the power line L form an over-current protection circuit A arranged in a shell 5, the over-current protection circuit A adopts an integrated circuit for high-precision measurement of electric consumption and leakage value A with the power-off relay J and the power line L, and the shell 5 is provided, with an external power access terminal 6 (two for a two-phase AC power supply, and three for a three-phase AC power supply) and an output power access terminal 3 (two for the two-phase AC power supply, and three for the three-phase AC power supply). The integrated circuit for high-precision measurement of electricity consumption and leakage value A arranged in the shell 5 adopts the technology of the integrated circuit for high-precision measurement of electricity consumption and leakage value with the power-off relay J and the power line L (two power lines including a live wire L and a neutral wire O are provided for the two-phase AC power supply, and three power lines are provided for the three-phase AC power supply) disclosed in China Patent Application CN201810152332X. As shown in FIG. 6, the integrated circuit for high precision measurement of electricity consumption and leakage value A includes the microprocessor chip part a that integrates the voltage detection electric signal amplifier 1, the current detection electric signal amplifier 2 and the microprocessor 3 with the memory. The microprocessor 3 is internally provided with voltage signal and current signal processing programs, and the microprocessor chip part a is provided with a communication port s for data exchange with the outside. A current correction processing program is arranged in the microprocessor 3. A low-resistance current sampling resistor R is connected in parallel to the two signal input pins of the current detection electrical signal amplifier 2. A standard current B (including high-precision direct current and high-precision standard alternating current) is applied to the resistance current sampling resistor R through a corrector, and a working power vcc of the microprocessor chip part a is supplied through the corrector i, so that a signal input terminal of the current detection electrical signal amplifier 2 can obtain a detection signal. The amplified detection signal is processed by the voltage signal and current signal processing programs of the microprocessor 3, and then is processed by the current correction processing program to form a corrected current value C, and the corrected current value C is solidified on the memory in the microprocessor 3 by a correction determination control signal outputted by the corrector to the microprocessor chip part a. Two power lines L and O respectively connected with a load and the poorer supply are respectively provided, wherein one power line (e.g. the power line L connected with the live wire) is connected in parallel with the low-resistance current sampling resistor R, a current transformer M is sleeved on the two power lines L and O, and two output ends of the current transfer per M are connected with the electrical signal input of the microprocessor 3 through an amplifier 7 integrated on the microprocessor chip part a. A control electrical signal of the microprocessor chip part a controls the power-off relay J to work through the switch circuit 6. The power-off relay S is provided with a short-circuit test circuit to test whether the power-off relay J works normally through a test button 8. The power switch of the power-off relay is connected to the live wire L of the power line, and one end of the power line (live wire L and neutral wire O) is connected with the external power access terminal 6, and the other end line power line is connected with the output power access terminal 9. The shell 5 is provided with a data and drive power interface 10, and a data interface is adopted as the data and drive power interface 10. A data exchange end and a drive power input end of the integrated circuit for high-precision measurement of electricity consumption and leakage value A are connected with the data and drive power interface.

Here, in order to improve monitoring accuracies of the disclosure on an electric current and a leakage current, before delivery, the disclosure uploads a presently monitored current value Ij (such as a detection value of 101 mA) to a cloud server by passing an electric current of a high-precision standard value to the disclosure as a reference value, such as 100 mA, the cloud server records a deviation, and carries out calculation and correction processing, and feeds back a correction algorithm to the memory in the microprocessor 3. After the disclosure is put into use, the deviation value is added to each measurement. The method is also used in detection and calculation technologies of leakage current. Therefore, a measuring accuracy of the disclosure can be significantly improved.

A manual reset power-off relay is adopted as the power-off relay J. Once the manual reset power-off relay J is disconnected, the manual reset power-off relay circuit can reset the circuit only through manual reset.

At least one of the external power access terminal 6 and the output power access terminal 9 is provided with a temperature detection device 11, and an electric signal output, of the temperature detection device 11 is connected with an electric signal input of the integrated circuit for high-precision measurement of electricity consumption and leakage value A. When the circuit is overloaded, the temperature of the wire will inevitably rise, and the temperature detection device 11 on the access terminal can detect this change and transmit the change to a central processing unit to make corresponding action response.

Figure 3:
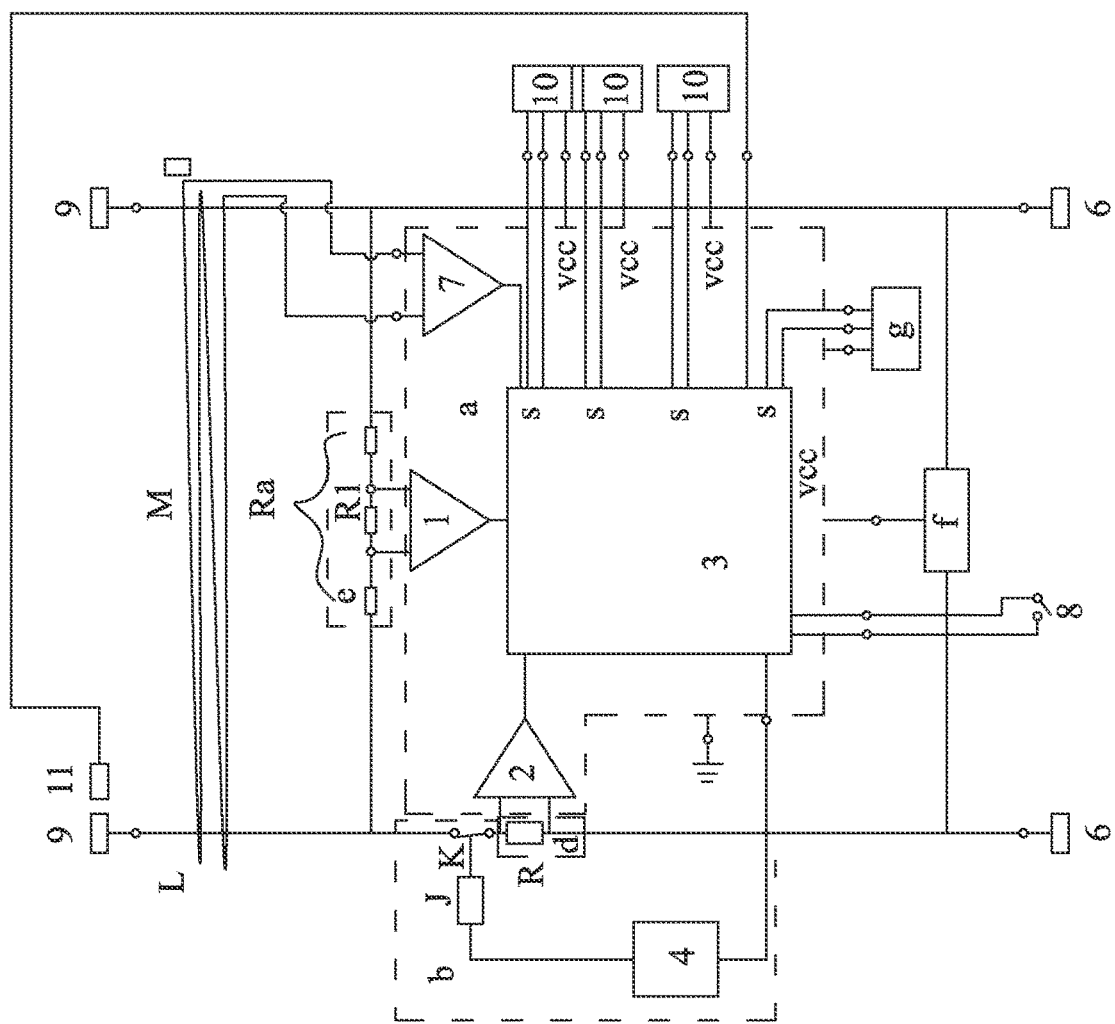
FIG. 3 is a structure diagram of Embodiment 3 of the disclosure.

Embodiment 3: as shown in FIG. 3, this embodiment is based on Embodiment 1, wherein a wireless transceiver device such wifi or NB-IOT is adopted as the wireless network communication part g. A power output end of the power circuit f is connected with the integrated circuit for high-precision measurement of electricity consumption and leakage value A and a power input end of wireless network communication part g. The microprocessor chip part a of the integrated circuit for high-precision measurement of electricity consumption and leakage value A is provided with a plurality of data output and input ends s. A data output and input end of the wireless network communication part g is connected with one of the data output and input ends s of the microprocessor chip part a of the integrated circuit for high-precision measurement of electricity consumption and leakage value A. A plurality of data interfaces corresponding to the number of the other data output and input ends s of the microprocessor chip part a of the integrated circuit for high-precision measurement of electricity consumption and leakage value A are provided, and each data interface is connected with one of the other data output and input ends s of the integrated circuit for high-precision measurement of electricity consumption and leakage value A and the power output end of the power circuit f to form a main electric protection circuit breaker.

Figure 4:
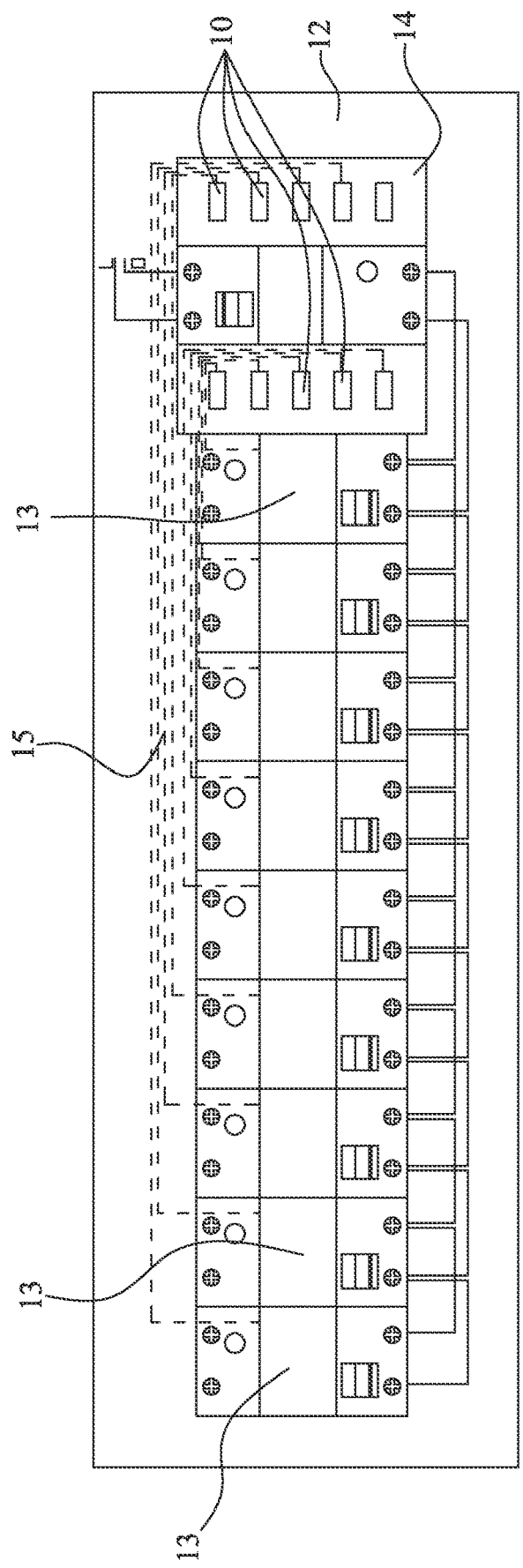
FIG. 4 is a structure diagram of an electric box.

Embodiment 4: as shown in FIG. 4, this embodiment is based on Embodiments 2 and 3, wherein the plurality of electric protection circuit breakers 13 of Embodiment 2 and the main electric protection circuit breaker 14 of Embodiment 3 are installed in an electric cabinet 12. A drive power supply is obtained and data exchange with the main electric protection circuit breaker 14 is realized through a data line 15 provided with data connectors respectively connected to a data socket of the electric protection circuit breaker 13 and a socket of the main electric protection circuit breaker 14. When in use, the external power access terminal of the main electric protection circuit breaker 14 is connected with an external power supply (for example, an external power access terminal of a live wire is connected with an external live wire, and an external power access terminal of a neutral wire is connected with an external neutral wire), while the output power access terminal of the main electric protection circuit breaker 14 is connected with the corresponding external power access terminal of each electric protection circuit breaker 13. The output power access terminal of each electric protection circuit breaker is connected with the power access terminal of a corresponding power consuming unit (for example, the output power access terminal of the live is connected with a live of the power access terminal of the corresponding power consuming unit, and the output power access terminal of the neutral wire is connected with a neutral wire of the power access terminal of the corresponding power consuming unit). In this way, current data, voltage data and temperature data obtained by the integrated circuit for high-precision measurement of electricity consumption and leakage value A can be sent out through the wireless network communication part g of the main electric protection circuit breaker 14, so that a monitor can monitor a poser consumption situation in real time. When the current is too large or the temperature is too high or leakage occurs, an alarm can be sent to the monitor through corresponding device, so that the monitor can process in time or send a control signal to control power-off of the electric protection circuit breaker, when the current exceeds a set safety value or the temperature is higher than a set value due to leakage, the integrated circuit for high-precision measurement of electricity consumption and leakage e controls the relay to operate to disconnect the power supply.

Figure 5:
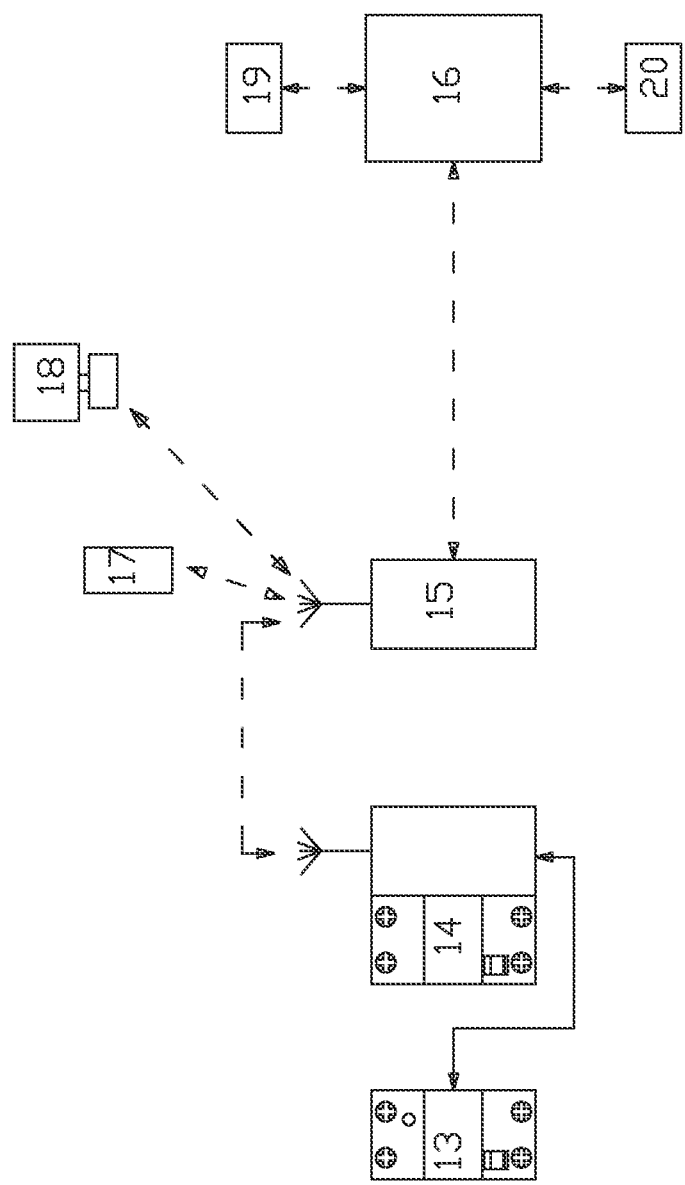
FIG. 5 is a structure diagram of a big data network.

Embodiment 5: as shown in FIG. 5, this embodiment is based on the foregoing embodiments, wherein current, voltage and temperature data collected by the electric protection circuit breaker 13 and the main electric protection circuit breaker 14 is transmitted to a server 16 through a wifi (or NB-IOT) wireless module on the main electric protection circuit breaker 14 and a wifi device 15 connected with a network and the network through a standard APP operation program, and a user is capable of obtaining the data via a networked mobile phone 17 or computer 18 through authorization and sending a control instruction to the power protection circuit breaker 13 and the main power protection circuit breaker 14 via the network through authorization, so as to disconnect the power supply through the power protection circuit breaker 13 and the main power protection circuit breaker 14 in case of danger. A safety monitoring organization 19 and a power supply bureau 20 can also obtain the current, voltage and temperature data of the user from the server 16, so as to accurately detect the power consumption situation and the safe power consumption situation of the user.

What is claimed is:

1. An electric protection circuit breaker, comprising a microprocessor chip part, a circuit breaker part connected between a power line and a power supply, a temperature detection part for detecting a temperature of the power line, a current detection part for detecting a current of the power line, and a voltage detection part for detecting a voltage of the power line; wherein a data collection of data sets of temperature change values, input current values, and voltage values, corresponding to various national standard diameters of power lines, imported in a set time period when a national standard voltage is applied, is stored in a memory of the microprocessor chip part; in the set time period, electronic data of an input current of the power line detected by the current detection part for detecting the current of the power line is transmitted to the microprocessor chip part, electronic data of a voltage of the power line detected by the voltage detection part for detecting the voltage of the power line is transmitted to the microprocessor chip part, and electronic data of the temperature of the power line detected by the temperature detection part is transmitted to the microprocessor chip part to determine data of a temperature change; the microprocessor chip part matches the electronic data of the temperature change, the electronic data of the input current, and the electronic data of the voltage obtained with the data sets in the data collection; if the matching is successful, the power line is confirmed to have the national standard diameter corresponding to the matched data set, and then the microprocessor chip part sets a corresponding safety protection current according to diameter information of the actually used power line obtained.

2. The electric protection circuit breaker according to claim 1, further comprising a wireless network communication part, wherein the data acquired by the microprocessor chip part is transmitted to a background server through the wireless network communication part, and the background server also transmits data acquired by other electric protection circuit breakers to the electric protection circuit breaker, so as to use big data machine learning to set the corresponding safety protection current automatically.

3. The electric protection circuit breaker according to claim 2, wherein the circuit breaker part comprises a power-off relay, the power-off relay, the microprocessor chip part, and the power line form an over-current protection circuit arranged in a shell, the over-current protection circuit adopts an integrated circuit for high-precision measurement of electric consumption and leakage value with a power-off relay and a power line, and a power switch of the power-off relay is connected to the power line; one end of the power line is connected to external power access terminal and the other end of the power line is connected to are output power access terminal; the shell is provided with a data and drive power interface, and a data exchange end and a drive power input end of the integrated circuit for high-precision measurement of electricity consumption and leakage value are connected to the data and drive power interface.

4. The electric protection circuit breaker according to claim 1, wherein the circuit breaker part comprises a power-off relay, the power-off relay, the microprocessor chip part, and the power line form an over-current protection circuit arranged in a shell, the over-current protection circuit adopts an integrated circuit for high-precision measurement of electric consumption and leakage value with the power-off relay and the power line, and a power switch of the power-off relay is connected to the power line; one end of the power line is connected with an external power access terminal and the other end of the power line is connected with an output power access terminal; the shell is provided with a data and drive power interface, and a data exchange end and a drive power input end of the integrated circuit for high-precision measurement of electricity consumption and leakage value are connected with the data and drive power interface.

5. The electric protection circuit breaker according to claim 4, wherein at least one of the external power access terminal and the output power access terminal is provided with the temperature detection device, and an electric signal output of the temperature detection device is connected with an electric signal input of the integrated circuit for high-precision measurement of electricity consumption and leakage value.

6. The electric protection circuit breaker according to claim 4, wherein more than one data exchange interface is arranged on the microprocessor chip part of the integrated circuit for high-precision measurement of electricity consumption and leakage value, and more than one power output interface is arranged on the corresponding power circuit, thus forming a main electric protection circuit breaker.

7. The electric protection circuit breaker according to claim 6, wherein the data exchange interface and the power output interface are integrated on a data interface, a plurality of electric protection circuit breakers and the main electric protection circuit breaker are installed in an electric box, and a drive power supply is obtained and data exchange with the main electric protection circuit breaker is realized through a data line provided with data connectors respectively connected to a data socket of the electric protection circuit breaker and a socket of the main electric protection circuit breaker.

8. The electric protection circuit breaker according to claim 6, wherein current, voltage, and temperature data collected by the electric protection circuit breaker is transmitted to a server through a wifi or NB-IOT wireless module on the electric protection circuit breaker and a wifi or NB-IOT device connected with a network and the network through a standard APP operation program and a user is capable of obtaining the data via a networked mobile phone or computer through authorization and sending a control instruction to the electric protection circuit breaker via the network through authorization, so as to disconnect the power supply through the electric protection circuit breaker in case of danger.

9. The electric protection circuit breaker according to claim 8, wherein when a current detection accuracy of the electric protection circuit breaker is calibrated, the electric protection circuit breaker uploads a current value I1 to a cloud server according to a measurement mechanism of the electric protection circuit breaker by passing a reference current I0 of a high precision standard value to the electric protection circuit breaker, the cloud server carries out algorithmic correction processing on the two current values, so that a current value approved by a system is that $I=f(I1, I0)$, and I is the current value corrected and calibrated by the system.

10. The electric protection circuit breaker according to claim 8, wherein a safety monitoring organization and a power supply department are also capable of acquiring leakage current, power consumption current, voltage, and temperature data of a user from the server, so as to accurately detect a power consumption situation and a safe power consumption situation of the user.

* * * * *